March 15, 1949.	A. M. ZAREM ET AL	2,464,279

CIRCUITS FOR PULSING ESSENTIALLY CAPACITIVE LOADS

Filed Sept. 26, 1947

INVENTORS
ABE M. ZAREM
FRED R. MARSHALL

BY M. O. Hayes

ATTORNEY

Patented Mar. 15, 1949

2,464,279

UNITED STATES PATENT OFFICE 2,464,279

CIRCUITS FOR PULSING ESSENTIALLY CAPACITIVE LOADS

Abe M. Zarem and Fred R. Marshall, Pasadena, Calif.

Application September 26, 1947, Serial No. 776,392

15 Claims. (Cl. 320—1)

(Granted under the act of March 3, 1883, as amended April 30, 1928; 370 O. G. 757)

This invention relates to a circuit for applying a pulse of actuating voltage to a Kerr cell. Since a Kerr cell constitutes an essentially capacitive load, the circuit of this invention may be employed with any capacitive load, although it is designed to be particularly efficacious when used with a Kerr cell, as will be pointed out hereinafter.

In high speed photography of the character disclosed in co-pending application, Serial No. 777,360, filed October 1, 1947, in the name of Abe M. Zarem, it is necessary to apply to an electro-optical cell, such as a Kerr cell, a high voltage pulse of extremely short duration. This pulse is not required to be rectangular, nor to be free of trailing oscillations, as long as these latter do not attain an amplitude sufficient to open the Kerr cell. These operating latitudes exist because of the fact that Kerr cell transmission is not a linear function of applied voltage. Instead, appreciable transmission is not instituted in the cell until the applied voltage has reached a substantial, threshold amplitude. Increasing the applied voltage beyond the threshold value causes the cell to open slowly, the transmission as a function of voltage being given by the following expression:

$$\text{Tr.} \propto \sin^2\left(\frac{\pi}{2}\left(\frac{v}{V_0}\right)^2\right)$$

Where:
Tr. = transmission
$v$ = voltage applied
$V_0$ = voltage required for maximum cell opening Thus, substantial trailing oscillations may be permitted in the voltage pulse as long as they do not attain the threshold amplitude, which opens the cell. Since the important factor, when using the Kerr cell as a photographic shutter, is the area under the transmission-time response curve of the cell, the response curve, and therefore its actuating pulse, need not be rectangular, but may be peaked or rounded at the top, as long as the effective opening of the cell is brief enough to meet the high speed requirements, and the amplitude of the voltage pulse is sufficiently great to insure adequate opening of the cell.

In known single pulse circuits, it is customary to employ a charged line matched to the impedance of the load. Such a circuit produces across the load a voltage pulse which is less than one-half the voltage stored in the line. In view of the fact that many types of Kerr cells require several kilovolts in order to open appreciably, it is desirable to employ a pulsing circuit in which the ratio between the pulse voltage applied to the cell and the stored voltage is as large as possible.

It is an object of this invention to provide an improved circuit for the pulsing of a Kerr cell.

It is another object of this invention to provide a circuit for pulsing a Kerr cell in which the ratio between the pulse appearing across the Kerr cell and the stored voltage will be large.

It is a further object of this invention to provide a circuit for pulsing a Kerr cell which will produce an extremely short, high voltage pulse without unduly high trailing oscillations.

It is a still further object of this invention to provide a circuit for pulsing a Kerr cell, in which the pulse duration may be simply controlled and adjusted.

The objects of this invention are attained by utilizing the resonance effect between the Kerr cell itself, which is essentially capacitive, and a series connected inductor. This resonance effect must be modified in order to eliminate unduly large trailing oscillations, and this is effected by placing a second inductive circuit across the Kerr cell circuit proper, and relating the inductance of the second circuit to the capacitance of a storage capacitor, which serves as a capacitive source of pulsing voltage. In accordance with this invention both inductive circuits are damped in a manner disclosed hereinafter.

A preferred embodiment of this invention will now be described in conjunction with the accompanying drawing, wherein.

Figure 1:
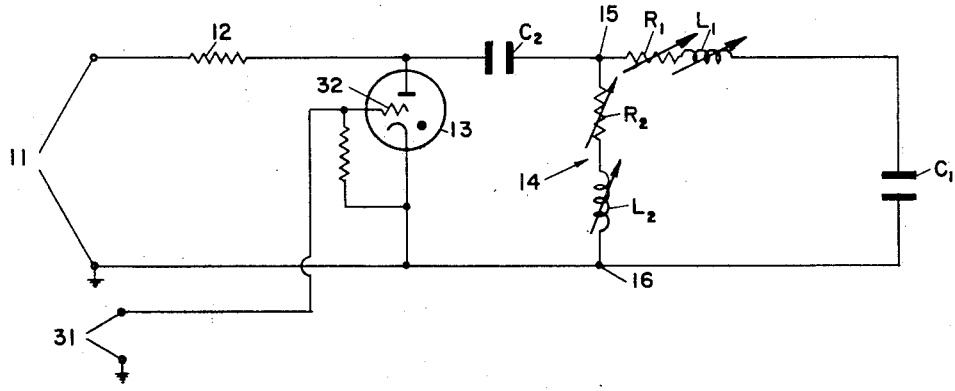
Fig. 1 is a diagram of the circuit.

In Fig. 1, $C_1$ designates a Kerr cell or other electro-optical cell, and also represents the capacitance of the cell. Insofar as the operation of the pulsing circuit of this invention is concerned, the element $C_1$ may be any essentially capacitive load. By the term "essentially capacitive load" as used herein, is meant any load in which the principal impedance component, for both theoretical and practical considerations, is capacitive.

The symbol $C_2$ designates a capacitive source of pulsing voltage in the form of a storage capacitor, to which energy is applied from a high voltage direct current supply 11, through a charging resistor 12. $C_2$ also stands for the capacitance of the source, which is much greater than $C_1$, being preferably at least five times $C_1$. When it is desired to pulse the Kerr cell $C_1$ with the voltage stored in capacitor $C_2$, a thyratron 13 connected in series with the two capacitors is energized, thereby in effect closing a switch between them.

Inasmuch as single pulse operation of the Kerr cell $C_1$ is desired, there is provided in accordance with the instant invention an inductor $L_1$ chosen so that it resonates with the Kerr cell $C_1$ at approximately the periodicity $T$ of the desired duration of the pulse to be applied to the Kerr cell. More specifically, the resonant periodicity between $C_1$ and $L_1$ is chosen to be from 85% to 100% of the desired pulse duration $T$. That is to say, if the desired pulse duration is $T$, $L_1$ (which also symbolizes the inductance of the element) is so chosen that the resonant frequency between $L_1$ and $C_1$ is approximately $1/T$, i. e. from $1/T$ to $1.18/T$. Where $L_1$ is series resonated with $C_1$, as illustrated in Fig. 1, its value is chosen to be approximately equal to $T^2/4\pi^2 C_1$, i. e., between $T^2/4\pi^2 C_1$ and $.73T^2/4\pi^2 C_1$, which results in near series resonance between $L_1$ and $C_1$ at a frequency $1/T$. This approximation to resonance rather than exact resonance is believed to be necessitated by virtue of the unavoidable coupling between the series connected $C_1$, $L_1$, and $R_1$, and a parallel circuit 14, to be described hereinafter, which modifies the resonating conditions among $R_1$, $L_1$, $C_1$.

By so selecting $L_1$, not only is the rise and fall, or pulse-like nature, of a resonant circuit utilized for a single pulse, but in addition the voltage appearing across $C_1$ may be made to approach twice the voltage stored in $C_2$, this approach being limited by the degree of damping resulting from other portions of the circuit to be introduced hereinafter. This is a considerable improvement over charged line, matched impedance types of storage sources, where the maximum useful voltage across the load cannot exceed one half the stored voltage.

Since the thyratron 13 constitutes a uni-directional switch, which blocks the flow of reverse current, it is necessary to provide a parallel circuit 14, so that the oscillation instituted by the discharge of $C_2$ through the resonant $L_1$ and $C_1$ may reverse and complete the pulse. In the absence of damping, and neglecting for the moment the effect of circuit 14, the exchange of energy among $C_2$, $L_1$, and $C_1$ would continue to produce repeated oscillations across $C_1$ which would repeatedly open the cell. For this reason a damping resistor $R_1$ is provided in series with inductor $L_1$. $R_1$, which also symbolizes the resistance of the element, should be less than the critical damping value for the resonant inductance $L_1$ and the capacitance $C_1$. By virtue of the nature of a Kerr cell, which permits of limited trailing oscillations, combined with circuit inhibitions introduced by the circuit 14 (described hereinafter), $R_1$ may be, and is preferably, chosen to lie between 10% and 20% of the critical damping value for $L_1$ and $C_1$. Expressed mathematically, $R_1$ is chosen to be less than $$2\sqrt{L_1/C_1}$$

and is preferably between $$\sqrt{L_1/25C_1}$$

and $$2\sqrt{L_1/25C_1}$$

The parallel circuit 14 is chosen to be of such a character that the voltage between the points 15 and 16 is substantially maintained during the first oscillation of discharge of capacitor $C_2$, which is the useful pulse across the Kerr cell $C_1$; and is caused to drop off rapidly near the termination of this first oscillation or pulse. This is achieved by constituting circuit 14 principally of an inductor $L_2$ which is resonated with the capacitance $C_2$ at a frequency of from one-half to one-quarter that of the resonant frequency of $L_1$ and $C_1$. That is to say, the periodicity of the resonant circuit $C_2 L_2$ is made two to four times as great as the desired pulse duration $T$. Expressed in other words $L_2$ (which also symbolizes the inductance of the element) is chosen to be between $T^2/\pi^2 C_2$ and $4T^2/\pi^2 C_2$.

It has been found advisable to damp circuit 14 with a resistor $R_2$, which also designates the resistance of the element. Because of the permissibility of minor trailing oscillations across the Kerr cell $C_1$, $R_2$ may be less than the critical damping resistance for $C_2-L_2$, and is preferably between 50% and 70% of the critical damping value. Expressed otherwise, $R_2$ is chosen to have a value less than $$2\sqrt{L_2/C_2}$$

preferably being between $$\sqrt{L_2 C_2}$$

and $$1.4\sqrt{L_2 C_2}$$

Figure 2:
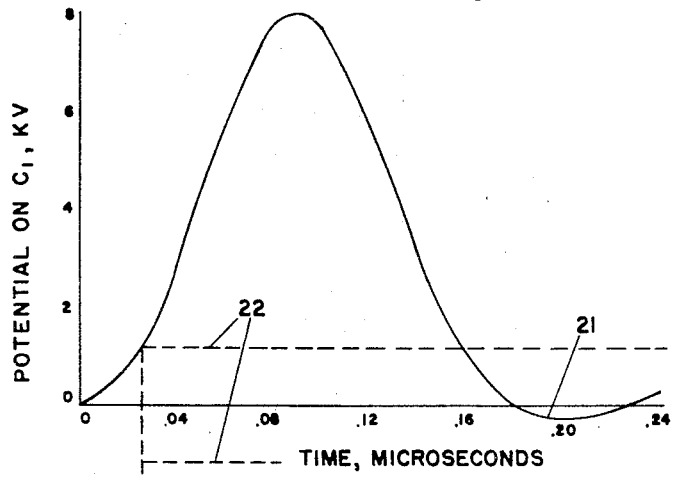
Fig. 2 is a graph showing a pulse of voltage which may be applied to a Kerr cell by the circuit of Fig. 1.

With a circuit constructed in accordance with Fig. 1, and parameters chosen in accordance with the above teaching, a pulse may be obtained across the Kerr cell $C_1$ substantially as shown in Fig. 2. It will be noted that the major trailing oscillation 21 of the pulse is well below the threshold voltage, represented by the dashed lines 22, which causes the Kerr cell to open. This will be readily understood by reference to Fig. 3, wherein it is seen that the voltage must rise to the threshold value before the cell starts to open. This is further evidenced by the absence of Kerr cell transmission in the region 23 corresponding to the trailing oscillation 21.

Operation

The operation of the circuit of Fig. 1, while relatively simple, will now be described.

Storage capacitor $C_2$ is charged to the desired potential from high voltage supply 11 through resistor 12 and circuit 14. The rate of charging is limited by resistor 12 sufficiently so that the voltage across circuit 14 is not enough to open the Kerr cell $C_1$. At the desired time, a triggering pulse is applied at 31 to the grid 32 of the thyratron 13, thereby in effect placing the voltage on $C_2$ across the points 15 and 16. The resulting pulse of voltage appearing on the Kerr cell $C_1$ is substantially as shown in Fig. 2. By the time a new charge has gathered on $C_2$ the thyratron 13 has become de-ionized, and the circuit is ready to be pulsed again at 31.

By employing the teaching of this invention it has been found possible to obtain extremely short exposure times when using the Kerr cell $C_1$ as a photographic shutter. This is due not only to the fact that the voltage pulse (Fig. 2) appearing across the shutter may be made of extremely short duration, but also to the fact that the resulting Kerr cell transmission (Fig. 3) varies transcendentally with the voltage and is therefore a much sharper spike. By employing the resonance feature discussed hereinbefore, it has been found possible to obtain a peak voltage across the Kerr cell $C_1$ which is greater than 120% of the voltage stored in the capacitor $C_2$.

A further very valuable advantage of the circuit lies in the ability of the parameters to be varied in acordance with a simple formula to alter the pulse duration, without otherwise affecting the shape or magnitude of the pulse. Starting with a given pulse duration T, if it is desired to double that duration to 2T, it is only necessary to quadruple the inductances $L_1$ and $L_2$ and to double the resistances $R_1$ and $R_2$. Similar relations hold for fractionating the pulse duration T. This characteristic of the circuit greatly simplifies its construction when used in a Kerr cell camera where variable exposure times are desired, inasmuch as the four variables may be ganged in a simple and easily constructed manner.

A satisfactory circuit has been constructed in accordance with the above teaching, employing the following parameters:

| | | |
|---|---|---|
| $C_1$ | micro-micro farads | 400 |
| $C_2$ | do | 53 |
| $L_1$ | micro henries | 13.2 |
| $L_2$ | do | 15.2 |
| $R_1$ and $R_2$ | ohms | 220 |

Figure 3:
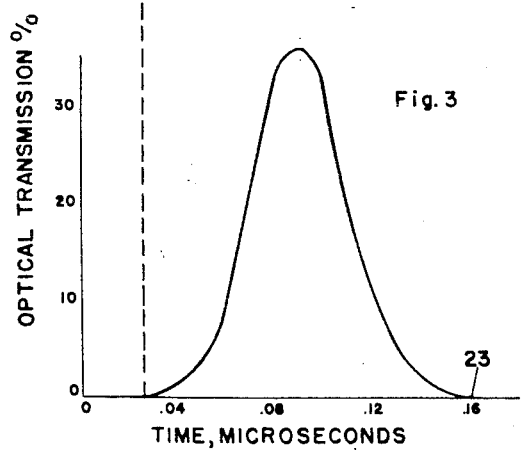
Fig. 3 is a graph showing the optical transmission of a Kerr cell resulting from the voltage pulse of Fig. 2.

The circuit of Fig. 1, when thus constructed, produced the responses shown in Figs. 2 and 3, with the values noted therein. The transmission-time characteristic of Fig. 3 results in an effective camera exposure time of 0.04 micro-seconds.

From the above description it will be seen that there has been described a circuit for pulsing an essentially capacitive load which is peculiarly adaptable to the pulsing of a Kerr cell shutter used in high speed photography.

It will be understood that this invention may be constructed and utilized with any suitable parameters, depending on the nature of the capacitive load to be pulsed, and that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A circuit for pulsed energization of an essentially capacitive load, comprising an essentially capacitive load; a gas filled tube; a discharge capacitor; said load, tube and capacitor being connected in series in a closed circuit; a source of energy connected to charge said capacitor; and means for rendering said tube conductive to discharge said capacitor thru said load.

2. A pulse circuit comprising an essentially capacitive load, a gas-filled tube, and a discharge capacitor, all connected in series in a closed circuit, an impedance connected in shunt with said load, means for charging said capacitor, and means for rendering said tube conductive to discharge said capacitor thru said load and said impedance.

3. A pulse circuit comprising an essentially capacitive load, a gas-filled tube, and a discharge capacitor, all connected in series in a closed circuit, an inductive resistive impedance connected in shunt with said load, means for charging said capacitor, and means for rendering said tube conductive to discharge said capacitor thru said load and said impedance.

4. A pulse circuit comprising an essentially capacitive load, a gas-filled tube, a discharge capacitor, and a first impedance, all connected in series in a closed circuit, a second impedance connected in shunt across said load and said first impedance, means for charging said capacitor, and means for rendering said tube conductive to discharge said capacitor thru said load and said impedances.

5. A pulse circuit comprising an essentially capacitive load, a gas-filled tube, a discharge capacitor, and a first inductive-resistive impedance, all connected in series in a closed circuit, a second inductive-resistive impedance connected in shunt across said load and said first impedance, means for charging said capacitor, and means for rendering said tube conductive to discharge said capacitor thru said load and said impedances.

6. A pulse circuit comprising an essentially capacitive load, a gas-filled tube, and a discharge capacitor, all connected in series in a closed circuit, an inductive-resistive impedance connected in shunt with said load, a charging circuit connected across said tube, and means for rendering said tube conductive to discharge said capacitor thru said load and said impedance.

7. A pulse circuit comprising an essentially capacitive load, a gas-filled tube, a discharge capacitor, and a first adjustable inductive-resistive impedance, all connected in series in a closed circuit, a second adjustable inductive-resistive impedance connected in shunt across said load and said first impedance, a charging circuit connected across said tube, and means for rendering said tube conductive to discharge said capacitor thru said load and said impedances.

8. A circuit for applying to an essentially capacitive load a pulse of voltage of predetermined duration, T, comprising an essentially capacitive load, a first inductive-resistive impedance connected in series with said load having an inductance value proper to resonate with the capacitance of said load at a frequency of approximately 1/T and a resistance value less than the critical damping value for the inductance and capacitance values of said first impedance and said load, respectively, a capacitive source of voltage, a second inductive-resistive impedance connected in shunt with said load and said first impedance, and switch means for applying the voltage of said source across said second impedance.

9. A circuit for applying to an essentially capacitive load a pulse of voltage of predetermined duration. T. comprising an essentially capacitive load, a first inductive-resistive impedance connected in series with said load having an inductance value proper to resonate with the capacitance of said load at a frequency between 1/T and 1.18/T and a resistance value less than the critical damping value for the inductance and capacitance values of said first impedance and said load, respectively, a capacitive source of voltage having a capacitance greater than that of said load, a second inductive-resistive impedance connected in shunt with said load and said first impedance having an inductance value proper to resonate with the capacitance of said source at a frequency of between 1/2T and 1/4T and a resistance value less than the critical damping value for the inductance and capacitance values of said second impedance and said load, respectively, and switch means for applying the voltage of said source across said second impedance.

10. A circuit for applying to an essentially capacitive load a pulse of voltage of predetermined duration, T, comprising an essentially capacitive load, a first inductive-resistive impedance connected in series with said load having an inductance value proper to resonate with the capacitance of said load at a frequency between 1/T and 1.18/T, and a resistance value less than the critical damping value for the inductance and capacitance values of said first impedance and said load, respectively, a capacitive source of voltage having a capacitance at least five times that of said load, a second inductive-resistive impedance connected in shunt with said load and said first impedance having an inductance value proper to resonate with the capacitance of said source at a frequency between 1/2T and 1/4T and a resistance value less than the critical damping value for the inductance and capacitance values of said second impedance and said load, respectively, and switch means for applying the voltage of said source across said second impedance.

11. A circuit for applying to an essentially capacitive load a pulse of voltage of predetermined duration, T, comprising an essentially capacitive load, a first inductive-resistive impedance connected in series with said load having an inductance value proper to resonate with the capacitance of said load at a frequency between 1/T, and 1.18/T, and a resistance value less than 50% of the critical damping value for the inductance and capacitance values of said first impedance and said load, respectively, a capacitive source of voltage having a capacitance at least five times of said load, a second inductive-resistive impedance connected in shunt with said load and said first impedance having an inductance value proper to resonate with the capacitance of said source at a frequency between 1/2T and 1/4T and a resistance value less than the critical damping value for the inductance and capacitance values of said second impedance and said load, respectively, and switch means for applying the voltage of said source across said second impedance.

12. A circuit for applying to an essentially capacitive load a pulse of voltage of predetermined duration, T, comprising an essentially capacitive load, a first inductive-resistive impedance connected in series with said load having an inductance value proper to resonate with the capacitance of said load at a frequency between 1/T, and 1.18/T and a resistance value between 10% and 20% of the critical damping value for the inductance and capacitance values of said first impedance and said load, respectively, a capacitive source of voltage having a capacitance at least five times that of said load, a second inductive-resistive impedance connected in shunt with said load and said first impedance having an inductance value proper to resonate with the capacitance of said source at a frequency between 1/2T and 1/4T and a resistance value between 50% and 70% of the critical damping value for the inductance and capacitance values of said second impedance and said load, respectively, and switch means for applying the voltage of said source across said second impedance.

13. A circuit for applying to an essentially capacitive load a pulse of voltage of predetermined duration, T, comprising an essentially capacitive load having a capacitance $C_1$, a first inductor, $L_1$ in series with said load having an inductance between $T^2/4\pi^2 C_1$, and $.73 T^2/4\pi^2 C_1$, a first resistor in series with said load and said first inductor having a value less than $$2\sqrt{L_1/C_1}$$

a capacitive source of voltage having a capacitance $C_2$ greater than that of said load, a second inductor and a second resistor connected in series and shunting said load, first inductor and first resistor, said second inductor having a value $L_2$ between $T^2/\pi^2 C_2$ and $4T^2/\pi^2 C_2$, said second resistor having a value less than $$2\sqrt{L_2/C_2}$$

and switch means for applying the voltage of said source across said series connected second inductor and second resistor.

14. A circuit for applying to an essentially capacitive load a pulse of voltage of predetermined duration, T, comprising an essentially capacitive load having a capacitance $C_1$, a first inductor in series with said load having an inductance between $T^2/4\pi^2 C_1$, and $.73 T^2/4\pi^2 C_1$, a first resistor in series with said load and said first inductor having a value less than $$2\sqrt{L_1/C_1}$$

a capacitive source of voltage having a capacitance $C_2$ at least 5 times that of said load, a second inductor and a second resistor connected in series and shunting said load, first inductor and first resistor, said second inductor having a value $L_2$ between $T^2/\pi^2 C_2$, and $4T^2/\pi^2 C_2$, said second resistor having a value less than $$2\sqrt{L_2/C_2}$$

and switch means for applying the voltage of said source across said series connected second inductor and second resistor.

15. A circuit for applying to an essentially capacitive load a pulse of voltage of predetermined duration, T, comprising an essentially capacitive load having a capacitance $C_1$, a first inductor in series with said load having an inductance between $T^2/4\pi^2 C_1$, and $.73 T^2/4\pi^2 C_1$, a first resistor in series with said load and said first inductor having a value between $$\sqrt{L_1/25 C_1}$$

and $$2\sqrt{L_1/25 C_1}$$

a capacitive source of voltage having a capacitance $C_2$ at least five times that of said load, a second inductor and a second resistor connected in series and shunting said load, first inductor and first resistor, said second inductor having a value $L_2$ between $T^2/\pi^2 C_2$ and $4T^2/\pi^2 C_2$, said second resistor having a value between $$\sqrt{L_2/C_2}$$

and $$1.4\sqrt{L_2/C_2}$$

and switch means for applying the voltage of said source across said series connected second inductor and second resistor.

ABE M. ZAREM.
FRED R. MARSHALL.

REFERENCES CITED

The following references are of record in the file of this patent:

UNITED STATES PATENTS

| Number | Name | Date |
|---|---|---|
| 2,359,178 | White | Sept. 26, 1944 |
| 2,378,897 | Burgwin | June 26, 1945 |
| 2,411,898 | Schelleng | Dec. 3, 1946 |